A. G. WETTERGREN & T. FURER.
EGG CUP.
APPLICATION FILED DEC. 15, 1909.
968,216.
Patented Aug. 23, 1910.
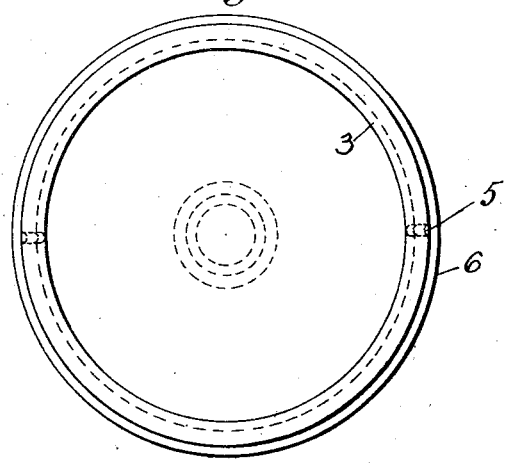
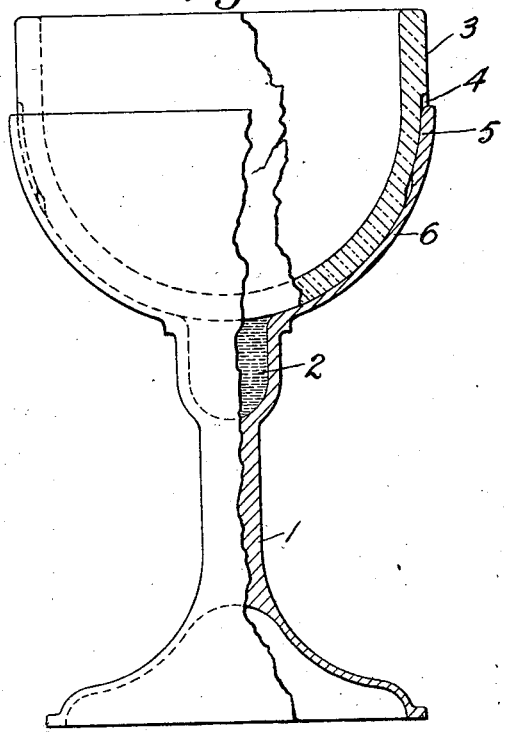
Witnesses
Frank H. Vick Jr.
C. B. Schroeder
Inventors
Addick G. Wettergren,
Thomas Furer,
per Cread & Tasker atty

UNITED STATES PATENT OFFICE.

ADDICK G. WETTERGREN AND THOMAS FURER, OF NEW YORK, N. Y.

EGG-CUP.

968,216.  Specification of Letters Patent.  Patented Aug. 23, 1910.

Application filed December 15, 1909. Serial No. 533,215.

*To all whom it may concern:*

Be it known that we, ADDICK G. WETTERGREN and THOMAS FURER, citizens of the United States of America, residing at New York city, in the county of New York and State of New York, have invented certain new and useful Improvements in Egg-Cups, of which the following is a specification, reference being had therein to the accompanying drawing.

This invention relates to a novel and ingenious egg cup.

The object is to provide a receptacle for eggs and of like articles wherein they may be kept hot, and the construction of which articles will provide for a separable part containing the egg which can readily be removed from the stand for washing and other purposes.

The invention consists essentially in a cup stand having a hot water recess and a separable cup of glass, or similar material, which is supported in said stand, and is provided with suitable means for preventing displacement while in use; and the invention also consists in numerous details and peculiarities in the construction, combination and arrangement of parts substantially as will be hereinafter described and claimed.

In the drawings, Figure 1 is a top plan view. Fig. 2 is a sectional side elevation.

1 denotes the stand which may vary widely in its exact contour and form. It preferably carries at its upper end integral therewith a semi-globular receptacle 6 which is adapted to receive the cup proper 3. In the stand 1 is a recess 2 for containing hot water. The lower part of the removable cup 3 rests above the receptacle 2, and if the latter is filled with hot water, or other steaming liquid, the result will be that the heat will be conveyed to the glass cup 3 and to the contents of the latter, thereby keeping said contents warm for such time as may be necessary before and during the meal. The size of the recess 2 may vary within wide limits, and the precise nature of its contents may also vary widely, the only object being to furnish some means for keeping the cup 3 warm, or for other purposes.

Cup 3 is of semi-globular form preferably. The usual material is glass, this being generally considered the most suitable. We are not to be restricted, however, to any particular material or form. On the outer surface of the cup 3, at two or more diametrically opposite points, are formed recesses 4 which are engaged by ribs 5 formed or provided on the inner surface of the receptacle 6. The grooves 4 and the ribs 5 may partake of any desired form, and may be deep or shallow as preferred. It will be understood that the grooves 4 can readily be formed in the cup 3 when the latter is made of glass by employing a suitable mold having means for shaping said grooves. The object of the tongue and groove connection at 4 and 5 is to enable the cup 3 to be supported in the top of the stand in such a manner that it will not readily be displaced, for with such a connection it will not be apt to become dislocated by shifting in a horizontal plane, or by moving on its spherical outer surface within the cup 6.

A novel device of the kind we have just set forth will be found very serviceable and useful in holding eggs and other like articles before and during a meal.

The exact shape of the parts and the way in which they are placed relatively to each other may vary within wide limits, and we reserve the right to change the construction and form within the scope of the claims.

Having thus described our invention, what we claim as new and desire to secure by Letters Patent, is:

1. In an egg-cup, the combination with a stand having a semi-globular receptacle formed with a hot water recess therein, of a separable semi-globular cup seated within the receptacle and in contact with the internal contour of the same and over and above the recess, said separable cup being adapted to contain egg or other food.

2. The combination with a stand having a hot water recess, and a curved receptacle around said recess, of a separable cup in the receptacle and having a groove engaged by a tongue on the inner surface of said receptacle.

3. The combination with a stand having a recess therein for containing hot water, and having also a curved receptacle, of a removable cup adapted to be supported in said receptacle, and means between the cup and the receptacle for preventing displacement of the cup.

In testimony whereof we affix our signatures in presence of two witnesses.

ADDICK G. WETTERGREN.
THOMAS FURER.

Witnesses:
   JEANNETTE STORK,
   C. B. SCHROEDER.